United States Patent
Wakayama (10) Patent No.: US 9,442,193 B2
(45) Date of Patent: Sep. 13, 2016

(54) RADAR SYSTEM AND DATA PROCESSING DEVICE

(75) Inventor: Toshio Wakayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 33 days.

(21) Appl. No.: 14/371,398

(22) PCT Filed: Jul. 12, 2012

(86) PCT No.: PCT/JP2012/004511
§ 371 (c)(1),
(2), (4) Date: Jul. 9, 2014

(87) PCT Pub. No.: WO2014/010000
PCT Pub. Date: Jan. 16, 2014

(65) Prior Publication Data
US 2015/0054678 A1    Feb. 26, 2015

(51) Int. Cl.
*G01S 13/90* (2006.01)
*G01S 7/40* (2006.01)
(Continued)

(52) U.S. Cl.
CPC ............... *G01S 13/90* (2013.01); *G01S 7/295* (2013.01); *G01S 7/40* (2013.01); *G01S 13/9011* (2013.01); *G06T 3/4053* (2013.01); *G06T 2207/10044* (2013.01); *G06T 2207/30181* (2013.01); *G06T 2210/36* (2013.01)

(58) Field of Classification Search
CPC .................................. G01S 7/295; G01S 7/40
USPC ........................ 342/25 R, 25 A, 25 B, 25 E
See application file for complete search history.

(56) References Cited

U.S. PATENT DOCUMENTS

| 4,989,008 A | 1/1991 | Fujisaka et al. |
| 5,608,404 A * | 3/1997 | Burns ............... G01S 13/90 342/25 A |

FOREIGN PATENT DOCUMENTS

| GB | WO 2012120137 A1 * | 9/2012 | ............. G01S 13/90 |
| JP | H09-178846 A | 7/1997 | |
| JP | H11-183607 A | 7/1999 | |

(Continued)

OTHER PUBLICATIONS

International Search Report; PCT/JP2012/004511; Aug. 7, 2012.
(Continued)

*Primary Examiner* — Peter Bythrow
*Assistant Examiner* — Helena Seraydaryan
(74) *Attorney, Agent, or Firm* — Studebaker & Brackett PC (57) ABSTRACT

An observation device 1 includes a transmitter and receiver (a transmitter 11, a transmission/reception switch 12, an antenna 13, and a receiver 14) that emits a predetermined radar wave to outside the observation device, and that receives the radar wave scattered by an object existing outside the observation device and acquires a received signal, a temporary image generator 15 that generates a temporary image from the received signal acquired by the transmitter and receiver, and a data transmitter 17 that transmits the temporary image generated by the temporary image generator 15 to a data processing device 2. The data processing device 2 includes a data receiver 21 that receives the temporary image transmitted by the data transmitter 17, and an image generator 24 that generates an image from both the temporary image received by the data receiver 21 and orbit data about a moving object.

7 Claims, 4 Drawing Sheets

(51) Int. Cl.
*G01S 7/295* (2006.01)
*G06T 3/40* (2006.01)

(56) References Cited

FOREIGN PATENT DOCUMENTS

| JP | 2005-024395 A | 1/2005 |
|---|---|---|
| JP | 2008-177768 A | 7/2008 |
| JP | 2010-236970 A | 10/2010 |
| JP | 2011-169869 A | 9/2011 |

OTHER PUBLICATIONS

The Mechanical Social Systems Foundation, "Gosei Kaiko Rader ni yoru Remote Sensing no Shoyoka ni Mukete no Feasibility Study", Mar. 2007, pp. 21-29, URL:http://www.jspacesystems.or.jp/jaros/kisikyou18sar_rimosen_shouyouka_fs.pdf.

The extended European search report issued by the European Patent Office on Feb. 9, 2016, which corresponds to European Patent Application No. 12881094.2-1812 and is related to U.S. Appl. No. 14/371,398.

* cited by examiner

RADAR SYSTEM AND DATA PROCESSING DEVICE

FIELD OF THE INVENTION

The present invention relates to a radar system and a data processing device that are mounted in a moving object, such as a satellite or an airplane, and that observe an object such as an earth surface.

BACKGROUND OF THE INVENTION

A synthetic aperture radar (SAR: Synthetic Aperture Radar) is a device that is mounted in a moving object, such as a satellite or an airplane, and that observes an object, such as an earth surface, with a high resolution. This radar usually emits a radio wave toward a direction nearly perpendicular to the direction of movement of the moving object. The radar carries out the observation on a region on the ground to which the radio wave is applied by acquiring a resolution with respect to a direction parallel to the direction of movement of the moving object through a synthetic aperture process, and also acquiring a resolution with respect to a direction of emitting the radio wave (direction of the distance) through a pulse compression process.

In this case, the synthetic aperture process is the one of improving the angular resolution. In general, the angular resolution of the radar is determined by the size of the antenna which is used when emitting the radio wave to space, and the larger aperture the antenna has, the higher angular resolution is acquired. However, in a case in which a radar is mounted in a moving object, a limitation is imposed on the size of an antenna which can be mounted in the radar. To solve this problem, an SAR provides an angular resolution equivalent to that of an antenna having an aperture of the same size as the length of a moving path by carrying out observation while moving, and combining received signals which are acquired during a fixed time period by performing signal processing. For example, an example of the signal processing method is shown in patent reference 1. In this patent reference 1, in order to acquire a high resolution image, high-accuracy signal processing in consideration of the satellite's orbit being a curved line is carried out.

RELATED ART DOCUMENT

Patent Reference

Patent reference 1: Japanese Unexamined Patent Application Publication No. 2011-169869

SUMMARY OF THE INVENTION

Problems to be Solved by the Invention

Further, in an actual image reconstruction process, a Doppler frequency analysis is performed on a received signal to acquire an angular resolution. More specifically, when observing an identical target point for a long time, the relative velocity between the radar and the target point varies during the observation time period. As a result, the received signal of the target point has a Doppler frequency bandwidth corresponding to the amount of change of the relative velocity. Because the amount of information about an angle at which the target exists increases with increase in this Doppler frequency width, the angular resolution is improved with increase in this Doppler frequency width.

In contrast, an SAR carries out a pulse compression process in order to acquire a distance resolution. Therefore, the radio wave is emitted in a pulse form. More specifically, an SAR is a pulsed Doppler radar that emits a pulse wave. Therefore, a Doppler frequency analysis for acquiring an angular resolution is carried on received signals discrete with a pulse repetition frequency (PRF).

Typically, an SAR mounted in, for example, a satellite carries out data transmission of the received signal from the satellite to a ground station, and the ground station carries out an image reconstruction process. This is because the image reconstruction process performed by an SAR requires a huge amount of computation, and, conventionally, it is difficult for a computer which can be mounted in the satellite to carry out the image reconstruction. However, in recent years, the performance of computers has been improving generally, and computers having computing power which enables even a satellite-mounted SAR to carry out image reconstruction on the satellite have been provided.

Further, because a received signal in an SAR typically has a large data size, the received signal may be transmitted to a ground station after a data compression process is performed on the received signal. Because the signal on which no image reconstruction process has been performed yet has a high random nature, a constraint is placed on an improvement in the efficiency of data compression. In contrast, because the random nature of the image data is reduced when image reconstruction is carried out on the satellite, the efficiency of data compression can be improved.

On the other hand, precise orbit data about the moving object is required for the image reconstruction process on the moving object. When the accuracy of this orbit data is not sufficient, there is a possibility that the accuracy of the image reconstruction process degrades and a sufficiently formed image can be acquired. However, there is a case in which a conventional SAR cannot provide high-accuracy orbit data on the moving object. As a result, no high-accuracy image is acquired on the satellite.

When carrying out the image reconstruction process on the moving object, as mentioned above, only a small amount of data transmission to a ground station is needed. A problem is, however, that when no high-accuracy orbit data is acquired on the moving object, there is a possibility that the accuracy of the image reconstruction process is reduced and degradation in the resolution occurs.

The present invention is made in order to solve the above-mentioned problems, and it is therefore an object of the present invention to provide a radar system and a data processing device that can acquire an image without degradation of a resolution while reducing the amount of data transmission.

Means for Solving the Problem

In accordance with the present invention, there is provided a radar system including an observation device that is mounted in a moving object and observes an object, and a data processing device that processes data from the observation device, in which the observation device includes: a transmitter and receiver that emits a predetermined radar wave to outside the radar system, and that receives the radar wave scattered by an object existing outside the radar system and acquires a received signal; a temporary image generator that temporarily carries out an azimuth compression process on the received signal acquired by the transmitter and receiver by using temporary orbit data to generate a temporary image; and a data transmitter that transmits the temporary image generated by the temporary image generator, and the data processing device includes: a data receiver that receives the temporary image transmitted by the data transmitter; and an image generator that carries out an azimuth compression process on the temporary image received by the data receiver by using orbit data having a higher degree of accuracy than the temporary orbit data to generate an image.

Advantages of the Invention

Because the radar system in accordance with the present invention is constructed as above, the radar system can acquire the image without degradation in the resolution while reducing the amount of data transmission.

EMBODIMENTS OF THE INVENTION

Hereafter, the preferred embodiments of the present invention will be explained in detail with reference to the drawings.

Embodiment 1

Figure 1:
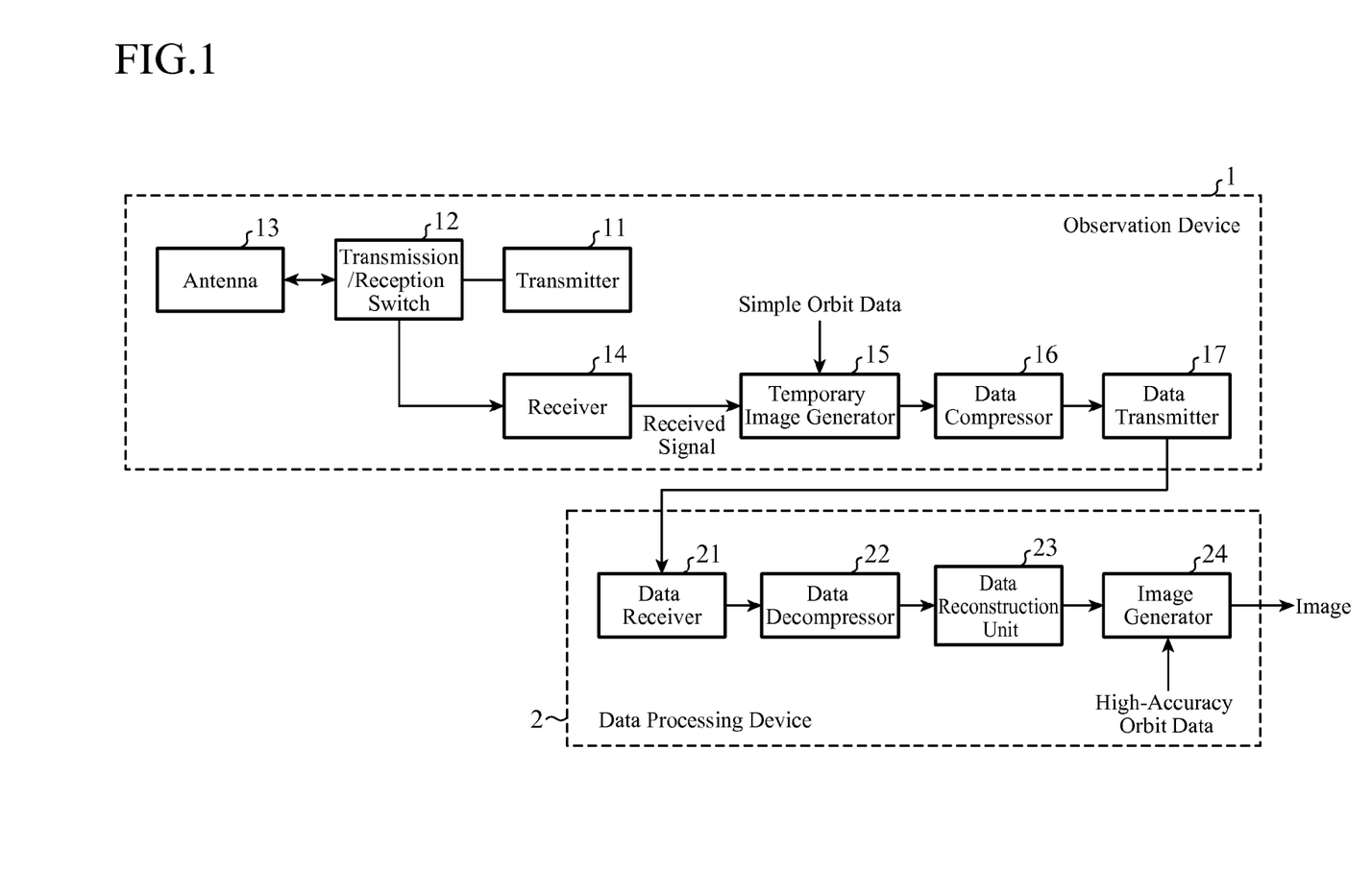
FIG. 1 is a block diagram showing the structure of a radar system in accordance with Embodiment 1 of the present invention.

FIG. 1 is a block diagram showing the structure of a radar system in accordance with Embodiment 1 of the present invention. The radar system is comprised of an observation device 1 and a data processing device 2, as shown in FIG. 1.

The observation device 1 is mounted in a moving object, and observes an object. This observation device 1 is comprised of a transmitter 11, a transmission/reception switch 12, an antenna 13, a receiver 14, a temporary image generator 15, a data compressor 16, and a data transmitter 17.

The transmitter 11 generates a predetermined pulse-shaped radar wave. The radar wave generated by this transmitter 11 is outputted to the transmission/reception switch 12. The transmission/reception switch 12 selectively changes the output destination of an input wave. This transmission/reception switch 12 outputs the radar wave from the transmitter 11 to space from the antenna 13, and outputs a radar wave from the antenna 13 to the receiver 14.

The observation device emits the radar wave from the antenna 13 and the transmission/reception switch 12 to outside the radar system (space), and also receives apart of the radar wave (scattered wave) scattered by an object (observation object) existing outside the radar system. The radar wave received by this antenna 13 is outputted to the transmission/reception switch 12.

The receiver 14 receives the radar wave from the transmission/reception switch 12. The receiver 14 then amplifies the radar wave and converts this radar wave into a received signal having a low frequency through frequency conversion. The received signal converted by this receiver 14 is outputted to the temporary image generator 15. The transmitter 11, the transmission/reception switch 12, the antenna 13, and the receiver 14 construct a transmitter and receiver in accordance with the present invention.

The temporary image generator 15 generates a temporary image (low resolution image) on the basis of the received signal from the receiver 14. The temporary image generated by this temporary image generator 15 is outputted to the data compressor 16.

The data compressor 16 performs a data compression process on the temporary image from the temporary image generator 15, and generates compressed image data. The compressed image data generated by this data compressor 16 is outputted to the data transmitter 17. The data transmitter 17 transmits the compressed image data from the data compressor 16 to the data processing device 2 at a remote location.

Further, the data processing device 2 is mounted in a data reception facility, and processes the data from the observation device 1. The data reception facility is typically a ground station. However, the data reception facility is not limited to a ground station. For example, the data reception facility can be held by a ship, an airplane, or the like. This data processing device 2 is comprised of a data receiver 21, a data decompressor 22, a data reconstruction unit 23, and an image generator 24.

The data receiver 21 receives the compressed image data from the data transmitter 17 of the observation device 1. The compressed image data received by this data receiver 21 is outputted to the data decompressor 22.

The data decompressor 22 decompresses the compressed image data from the data receiver 21 to acquire the original temporary image. The temporary image acquired by this data decompressor 22 is outputted to the data reconstruction unit 23.

The data reconstruction unit 23 carries out a process inverse to an azimuth compression process in an image reconstruction process by the temporary image generator 15 on the temporary image from the data decompressor 22 to temporarily return the temporary image to a signal on which no azimuth compression has been performed yet. The image which is returned to the signal, on which no azimuth compression has been performed yet, by this data reconstruction unit 23 is outputted to the image generator 24.

The image generator 24 generates an image having a higher resolution than that generated by the temporary image generator 15 on the basis of the image from the data reconstruction unit 23 by using high-accuracy orbit data about the moving object in which the observation device 1 is mounted. The image generated by this image generator 24 is outputted to outside the radar system.

Figure 2:
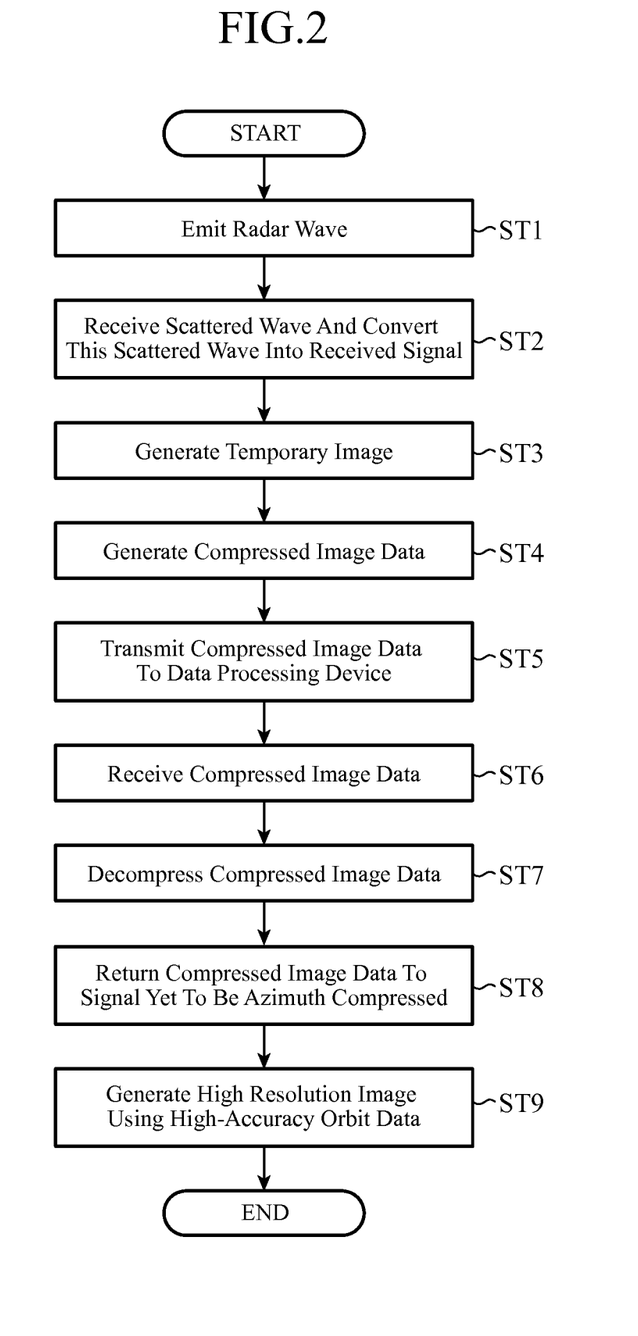
FIG. 2 is a flow chart diagram showing the operation of the radar system in accordance with Embodiment 1 of the present invention.

Next, the operation of the radar system constructed as above will be explained with reference to FIG. 2. In the operation of the radar system, the transmitter 11 generates a predetermined pulse-shaped radar wave first, and emits this radar wave to outside the radar system from the antenna 13 by way of the transmission/reception switch 12, as shown in FIG. 2 (step ST1). The antenna 13 then receives a part of the radar wave (scattered wave) scattered by an object existing outside the radar system, and outputs the part to the receiver 14 by way of the transmission/reception switch 12. The receiver 14 then amplifies this radar wave, and also converts the radar wave into a received signal having a low frequency through frequency conversion (step ST2). The received signal received and converted by this receiver 14 is outputted to the temporary image generator 15.

The temporary image generator 15 then generates a temporary image on the basis of the received signal from the receiver 14 (step ST3). In an SAR, a received signal is acquired on two-dimensional space which is defined by two axes including a distance axis and an azimuth axis. Before an image reconstruction process is performed, an image which is blurred both in a direction of the distance axis and in a direction of the azimuth axis is provided. Therefore, the temporary image generator 15 improves the distance resolution by performing a pulse compression process, and improves the azimuth resolution by performing an azimuth compression process. Although no detailed explanation will be made hereafter concerning the pulse compression process and the azimuth compression process because they are the same as methods known conventionally, they typically consist of a data compensation process and a coherent integration process in a direction of the azimuth axis. There are a case in which the data compensation process is carried out on the azimuth axis and a case in which data is converted into data on an azimuth frequency axis by using a Fourier transform, and the data compensation process is carried out on the data. In the coherent integration, a Fourier transform is typically used for an improvement in the efficiency of computation.

In order to carry out the azimuth compression process with a high degree of accuracy, high-accuracy orbit data about the moving object is required. However, because the resolution of the image generated by the temporary image generator 15 is low, orbit data having a low degree of accuracy can be accepted. Further, although a satellite's orbit is bent like an ellipse in a case of, for example, a satellite-mounted SAR, as described in above-mentioned patent reference 1, even when, for example, an image reconstruction process which approximately assumes this orbit to be a linear one is carried out, low resolution image reconstruction can be implemented.

The data compressor 16 then performs the data compression process on the temporary image from the temporary image generator 15 to generate compressed image data (step ST4). Through this data compression process, the data size of the compressed image data becomes smaller than the data size of the original image. The type of the data compression method is not limited particularly, and a method known typically can be used as the data compression method. For example, compression according to JPEG can be carried out. The compressed image data generated by this data compressor 16 is outputted to the data transmitter 17.

The data transmitter 17 then transmits the compressed image data from the data compressor 16 to the data processing device 2 at a remote location (step ST5). More specifically, the compressed image data is transmitted from the observation device 1 mounted in the moving object to the data processing device 2 installed in a data reception facility placed at a remote location by the data transmitter 17. This transmission can be carried out by using a data transmission method which is the same as that for use in typical SAR satellites.

The data receiver 21 of the data processing device 2 then receives the compressed image data from the data transmitter 17 of the observation device 1 (step ST6). The compressed image data received by this data receiver 21 is outputted to the data decompressor 22.

The data decompressor 22 then decompresses the compressed image data from the data receiver 21 to acquire the original temporary image (step ST7). When the data compression method used by the data compressor 16 is lossless compression, the temporary image acquired by the data decompressor 22 is completely the same as the temporary image generated by the temporary image generator 15. When a lossy data compression method is used with priority being given to the compression efficiency, noise occurring due to the compression is added to the temporary image acquired by the data decompressor 22. The temporary image acquired by this data decompressor 22 is outputted to the data reconstruction unit 23.

The data reconstruction unit 23 then carries out a process inverse to the azimuth compression process in the image reconstruction process by the temporary image generator 15 on the temporary image from the data decompressor 22 to temporarily return the temporary image to a signal on which no azimuth compression has been performed yet (step ST8). For example, it is assumed hereafter that a method called a chirp scaling method is used by the temporary image generator 15. In the chirp scaling method, image reconstruction is carried out by using a multiplication of a Fourier transform by a phase compensation coefficient. Therefore, the data reconstruction unit 23 carries out an inverse Fourier transform and also acquires a signal on which no azimuth compression has been performed yet by dividing the phase value by which a Fourier transform is multiplied by the temporary image generator 15. In addition, the temporary image generator 15 enters a state in which the temporary image generator is called when low-accuracy orbit data is used. The image reconstructed by this data reconstruction unit 23 is outputted to the image generator 24.

The image generator 24 then carries out the azimuth compression process on the temporary image from the data reconstruction unit 23 by using high-accuracy orbit data about the moving object to generate a high resolution image (step ST9). More specifically, the image generator carries out a high-accuracy image reconstruction process on the acquired signal on which no azimuth compression has been performed yet (carries out an azimuth compression process with a higher azimuth resolution than that of the azimuth compression process performed by the temporary image generator 15) to generate a high resolution image. In this high-accuracy image reconstruction process, orbit data having a higher degree of accuracy than that of the simple orbit data for use in the temporary image generator 15 is used.

As mentioned above, because the radar system in accordance with this Embodiment 1 is constructed in such a way as to generate an image on a moving object, the data compression efficiency at the time of carrying out data transmission from the moving object to the data reception facility can be increased and the amount of data transmission can be reduced. As a result, the radar system can carry out the data transmission in a short time. Further, the radar system can carry out the data transmission even when using the data transmitter 17 and the data receiver 21 having a low data transmission ability. For example, because the antenna gains of the data transmitter 17 and the data receiver 21 can be made small, the antenna size can be downsized. Further, because the radar system carries out the image reconstruction process by using the high-accuracy orbit data also after data transmission, the radar system can acquire an image having a high resolution.

Although the radar system in accordance with Embodiment 1 is constructed in such a way that after carrying out data compression on the image, the data compressor 16 of the observation device 1 transmits the image to the data processing device 2, and the data decompressor 22 of the data processing device 2 decompresses the compressed data to extract the original image, the data compressor 16 and the data decompressor 22 can be omitted and the temporary image generated by the temporary image generator 15 can be transmitted to the data processing device 2 just as it is. In the image reconstruction process including the azimuth compression process, the pulse compression process, or both of these processes, the data size after the process becomes smaller than the data size before the process even when no data compression is carried out. Therefore, by causing the observation device to carry out these processes, the radar system can reduce the amount of data transmission even when carrying out no data compression.

Embodiment 2

Figure 3:
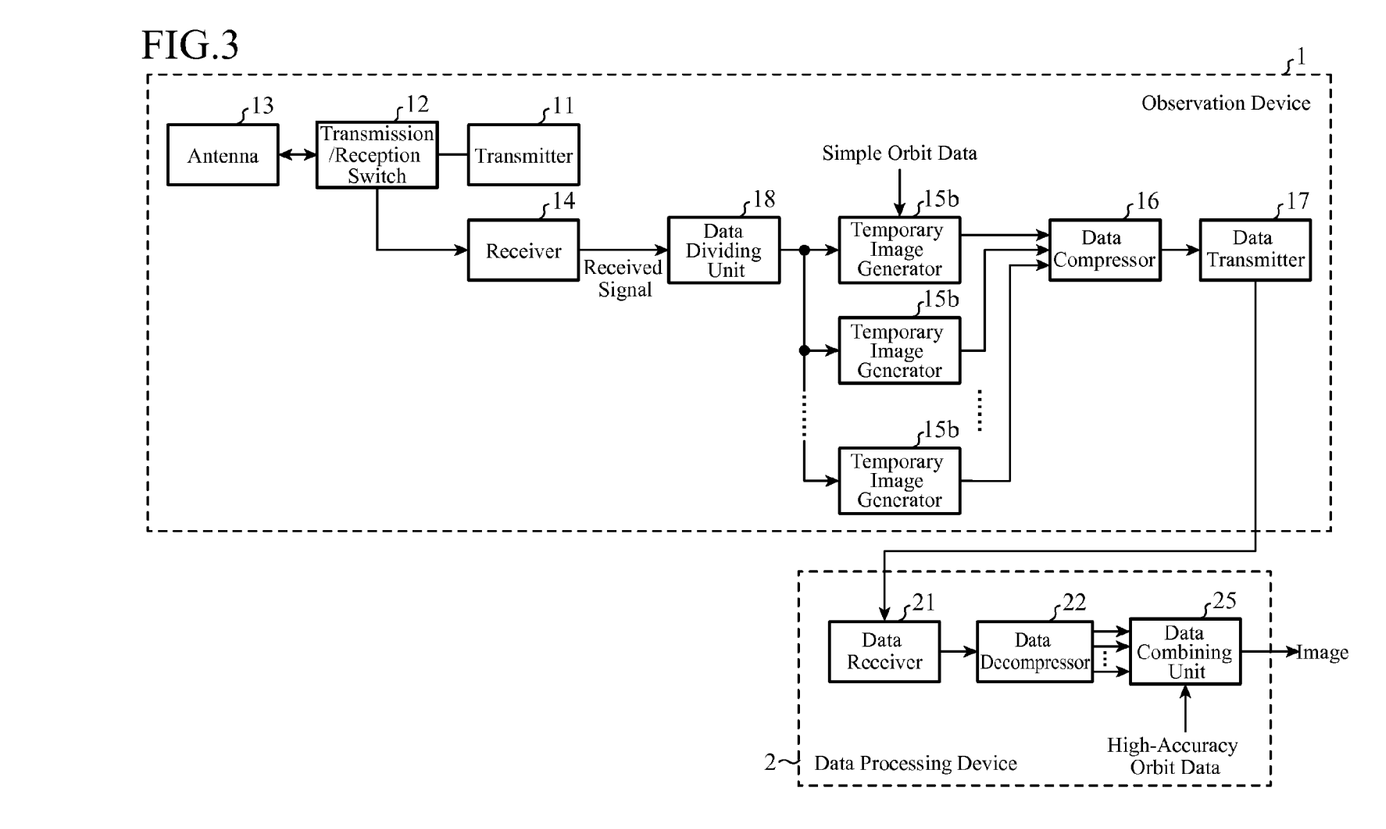
FIG. 3 is a block diagram showing the structure of a radar system in accordance with Embodiment 2 of the present invention.

In Embodiment 1, the structure of, after the data processing device 2 receives the image generated by the observation device 1, temporarily returning the image to a signal on which no azimuth compression has been performed yet by using the data reconstruction unit 23 is shown. In contrast with this, in Embodiment 2, a case in which an observation device 1 carries out azimuth compression part way through, and a data processing device 2 carries out the remaining part of the azimuth compression process is shown. FIG. 3 is a block diagram showing the structure of a radar system in accordance with Embodiment 2 of the present invention. In the radar system in accordance with Embodiment 2 shown in this FIG. 3, the temporary image generator 15 of the radar system in accordance with Embodiment 1 shown in FIG. 1 is replaced by a data dividing unit 18 and a plurality of temporary image generators 15b, and the data reconstruction unit 23 and the image generator 24 of the radar system in accordance with Embodiment 1 are replaced by a data combining unit (image generator) 25. The other structural components are the same as those of the radar system in accordance with Embodiment 1 and are designated by the same reference numerals, and the explanation of the other structural components will be omitted hereafter.

The data dividing unit 18 divides a received signal from a receiver 14 into a plurality of sections in a temporal direction, and outputs these sections to the plurality of temporary image generators 15b respectively. The plurality of temporary image generators 15b generate a plurality of temporary images (low resolution images) on the basis of the received signals about the plurality of sections from the data dividing unit 18 respectively. Each of the temporary images generated by these temporary image generators 15b is outputted to a data compressor 16.

The data combining unit 25 generates a single high resolution image by combining a plurality of temporary images from a data decompressor 22. The image generated by this data combining unit 25 is outputted to outside the radar system.

The radar system in accordance with this embodiment is constructed in such a way that the execution of an image reconstruction method, which is known as a subaperture method, is shared between the observation device 1 and the data processing device 2. The subaperture method is disclosed in, for example, patent reference 1. In accordance with the subaperture method, a received signal acquired during a synthetic aperture is divided into sections in a temporal direction first. Then, reconstruction of a low resolution temporary image is carried out on a signal in each small section after division by each temporary image generator 15b. Because the process carried out at this time is azimuth compression in a short synthetic aperture time, the azimuth resolution is low. Because each temporary image has a low resolution, the accuracy of orbit data used at this time (temporary orbit data acquired on an orbit) can be lower than that of orbit data for use in the data processing device 2 which will be mentioned below.

Next, the data compressor 16 collectively carries out data compression on the plurality of temporary images generated by the plurality of temporary image generators 15b. In this data compression, after the plurality of temporary images are simply coupled to one another and formed into single data, data compression can be carried out on this single data, or data compression can be carried out on each of the temporary images and the plurality of data compressed can be combined into single data. The data volume after the imaging becomes smaller than that before the imaging. Further, because the imaging is carried out, the efficiency of the data compression becomes high. As a result, it is expected that the data size becomes smaller than that in a case of transmitting a yet-to-be-processed received signal.

The compressed data is returned to data when outputted from the temporary image generators 15b, i.e., the plurality of temporary images by way of a data transmitter 17, a data receiver 21, and the data decompressor 22. The data combining unit 25 combines the plurality of temporary images to generate a single high resolution image. Because a concrete processing procedure is the same as that disclosed by patent reference 1, the concrete processing procedure will be not described in detail. In order to make the image generated in this embodiment have a high resolution, orbit data having a higher degree of accuracy than that required in the above-mentioned process carried out in the observation device 1 is required.

As mentioned above, the amount of data transmission from the observation device 1 to the data processing device 2 can be reduced because the observation device 1 in accordance with this Embodiment 2 carries out up to the temporary imaging process, and a high resolution image can be acquired because the data processing device 2 in accordance with this Embodiment 2 carries out the signal processing.

Embodiment 3

Figure 4:
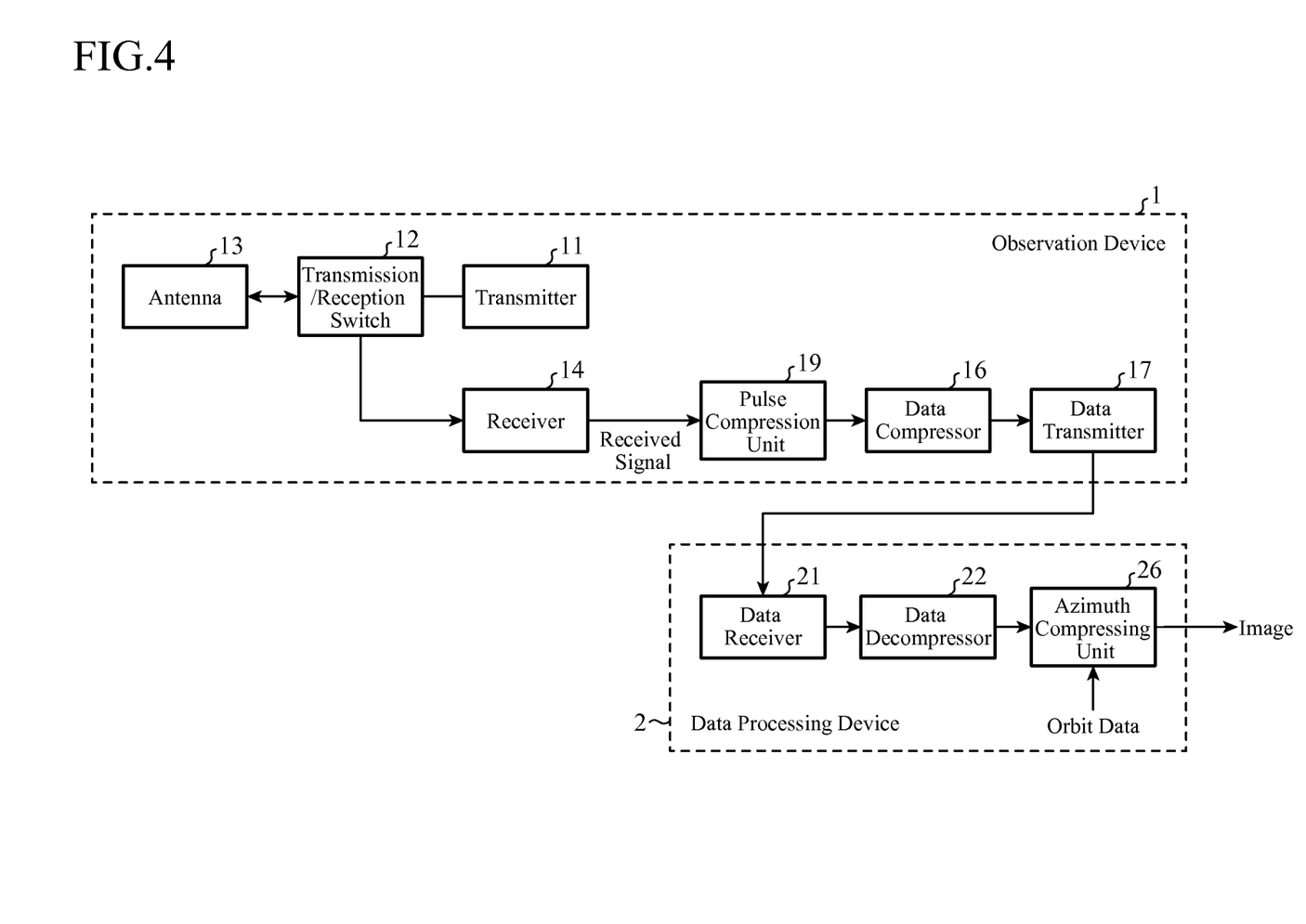
FIG. 4 is a block diagram showing the structure of a radar system in accordance with Embodiment 3 of the present invention.

In Embodiment 1, the case in which the observation device 1 carries out both the pulse compression process and the azimuth compression process is shown. In contrast with this, in Embodiment 3, a case in where an observation device carries out only a pulse compression process is shown. FIG. 4 is a block diagram showing the structure of a radar system in accordance with Embodiment 3 of the present invention. In the radar system in accordance with Embodiment 3 shown in this FIG. 4, the temporary image generator 15 of the radar system in accordance with Embodiment 1 shown in FIG. 1 is replaced by a pulse compression unit (temporary image generator) 19 and the image generator 24 of the radar system in accordance with Embodiment 1 is replaced by an azimuth compressing unit (image generator) 26, and the data reconstruction unit 23 is removed. The other structural components are the same as those of the radar system in accordance with Embodiment 1 and are designated by the same reference numerals, and the explanation of the other structural components will be omitted hereafter.

The pulse compression unit 19 generates a temporary image having a high distance resolution by carrying out only the pulse compression process on the basis of a received signal from a receiver 14. The temporary image generated by this pulse compression unit 19 is outputted to a data compressor 16. The data compressor 16 performs a data compression process on the temporary image from the pulse compression unit 19 to generate compressed image data.

A high resolution image is acquired in a direction of a distance axis by this pulse compression unit 19. The data volume is reduced by a pulse width also before the data compression is carried out. In addition, the improvement in the distance resolution causes an increase in the efficiency of the data compression by the data compressor 16. Further, because the pulse compression process is independent of the orbit of the moving object, the observation device 1 mounted in the moving object does not need any orbit data.

The azimuth compressing unit 26 carries out an azimuth compression process for improving the azimuth resolution on the basis of the temporary image from the data decompressor 22 by using the orbit data about the moving object to generate a high resolution image. The image generated by this azimuth compressing unit 26 is outputted to outside the radar system.

As mentioned above, the radar system in accordance with this Embodiment 3 is constructed in such a way as to, when generating a temporary image on the moving object, carry out only the pulse compression process. Even in this embodiment, there can be provided the same advantages as those provided by Embodiment 1.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

Because the radar system and the data processing device in accordance with the present invention include the observation device that is mounted in a moving object and observes an object, and the data processing device that processes data from the observation device, and the observation device includes: the transmitter and receiver that emits a predetermined radar wave to outside the radar system, and that receives the above-mentioned radar wave scattered by an object existing outside the radar system and acquires a received signal; the temporary image generator that generates a temporary image from the received signal acquired by the transmitter and receiver; and the data transmitter that transmits the temporary image generated by the temporary image generator to the data processing device, and the data processing device includes: the data receiver that receives the temporary image transmitted by the data transmitter; and the image generator that generates an image from both the temporary image received by the data receiver and orbit data about the moving object, and the radar system can acquire the image without degradation in the resolution while reducing the amount of data transmission, the radar system and the data processing device in accordance with the present invention can be applied to a synthetic aperture radar (SAR).

EXPLANATIONS OF REFERENCE NUMERALS 1 observation device, 2 data processing device, 11 transmitter, 12 transmission/reception switch, 13 antenna, 14 receiver, 15 and 15b temporary image generator, 16 data compressor, 17 data transmitter, 18 data dividing unit, 19 pulse compression unit, 21 data receiver, 22 data decompressor, 23 data reconstruction unit, 24 image generator, 25 data combining unit, 26 azimuth compressing unit.

The invention claimed is:

1. A radar system including an observation device that observes an object, said observation device being mounted in a moving object, and a data processing device that processes data from said observation device, wherein
said observation device comprises:
a transmitter and receiver that emits a predetermined radar wave to outside said radar system, and that receives said radar wave scattered by an object existing outside said radar system and acquires a received signal;
a temporary image generator that temporarily carries out an azimuth compression process on the received signal acquired by said transmitter and receiver by using temporary orbit data to generate a temporary image, said temporary orbit data being based on movement of said moving object relative to said object existing outside said radar system; and
a data transmitter that transmits the temporary image generated by said temporary image generator, and
said data processing device comprises:
a data receiver that receives the temporary image transmitted by said data transmitter; and
an image generator that carries out an azimuth compression process on the temporary image received by said data receiver by using orbit data having a higher degree of accuracy than said temporary orbit data to generate an image, said orbit data being based on movement of said moving object relative to said object existing outside said radar system.

2. The radar system according to claim 1, wherein said temporary image generator divides said received signal into a plurality of sections in a temporal direction, and generates a plurality of temporary images by using received signal portions respectively corresponding to said sections, and said image generator generates one image by combining said plurality of temporary images.

3. A data processing device that processes data from an observation device that observes an object, said observation device being mounted in a moving object, said data processing device comprising:
a data receiver that receives a temporary image, which said observation device generates by receiving a predetermined radar wave, which said observation device emits to outside said observation device and which is scattered by an object existing outside said observation device, to acquire a received signal and temporarily carrying out an azimuth compression process on said received signal by using temporary orbit data, said temporary orbit data being based on movement of said moving object relative to said object existing outside said radar system; and
an image generator that carries out an azimuth compression process on the temporary image received by said data receiver by using orbit data having a higher degree of accuracy than said temporary orbit data to generate an image, said orbit data being based on movement of said moving object relative to said object existing outside said radar system.

4. An observation device that observes an object, said observation device being mounted in a moving object, said observation device comprising:
- a transmitter and receiver that emits a predetermined radar wave to outside said observation device, and that receives said radar wave scattered by an object existing outside said observation device and acquires a received signal;
- a temporary image generator that temporarily carries out an azimuth compression process on the received signal acquired by said transmitter and receiver by using temporary orbit data to generate a temporary image, said temporary orbit data being based on movement of said moving object relative to said object existing outside said radar system; and
- a data transmitter that transmits said temporary image to a data processing device that carries out an azimuth compression process on said temporary image generated by said temporary image generator by using orbit data having a higher degree of accuracy than said temporary orbit data to generate an image, said orbit data being based on movement of said moving object relative to said object existing outside said radar system.

5. The radar system according to claim 1, wherein
said temporary orbit data is based on an approximation of linear movement of said moving object relative to said object existing outside said radar system, and
said orbit data is based on actual movement of said moving object relative to said object existing outside said radar system.

6. The data processing device of claim 3, wherein
said temporary orbit data is based on an approximation of linear movement of said moving object relative to said object existing outside said radar system, and
said orbit data is based on actual movement of said moving object relative to said object existing outside said radar system.

7. The observation device of claim 4, wherein
said temporary orbit data is based on an approximation of linear movement of said moving object relative to said object existing outside said radar system; and
said orbit data is based on actual movement of said moving object relative to said object existing outside said radar system.

* * * * *